United States Patent Office 3,393,976
Patented July 23, 1968

---

3,393,976
PREPARATION OF MAGNESIUM HYDROXIDE BY TREATING DOLOMITE WITH MAGNESIUM NITRATE SOLUTION
Lloyd M. Housh, Santa Clara, Calif., assignor to Kaiser Aluminum & Chemical Corporation, Oakland, Calif., a corporation of Delaware
No Drawing. Filed Nov. 8, 1965, Ser. No. 506,838
5 Claims. (Cl. 23—201)

ABSTRACT OF THE DISCLOSURE

A method of recovering magnesia values from dolomite comprising reacting the dolomite with a magnesium nitrate solution to form magnesium hydroxide and calcium nitrate, followed by reacting the calcium nitrate with further dolomite and carbon dioxide to form calcium carbonate and regenerate the magnesium nitrate solution.

---

This invention concerns the production of magnesium hydroxide, $Mg(OH)_2$, and particularly a method of producing it from dolomite.

Magnesium hydroxide is a useful material in its own right, for example, as the familiar milk of magnesia. Perhaps more important, however, is its use as a raw material to produce magnesium oxide (MgO) by dehydration, the oxide being used, for example, as a refractory material. One widespread natural source of magnesium oxide is the mineral dolomite, which is a mixed carbonate of calcium and magnesium. Various processes have been suggested for recovering magnesium oxide values from dolomite. For example, it is known to calcine the dolomite to produce MgO and CaO and then to react the calcined dolomite with magnesium chloride ($MgCl_2$) in aqueous solution to produce a precipitate of magnesium hydroxide and calcium chloride in solution. When a cheap source of magnesium chloride is readily available, for example in the form of sea water or naturally occurring brines, it is economical to discard the calcium chloride produced by the above process. However, when other reactants are used, it will generally be found economically desirable to recover the calcium-containing material produced or to convert it to another form so as to recover the original reactant material.

One of the disadvantages of the above-described "sea water" method of producing magnesium hydroxide is that the magnesium hydroxide precipitate formed is a difficultly filterable sludge of finely divided particles. It is one of the advantages of this invention that the magnesium hydroxide formed is in a readily filterable form, enabling ready separation of the hydroxide precipitate from the solution containing the calcium values.

According to this invention, calcined dolomite is contacted by and reacted with an aqueous solution containing up to about 150 g. of magnesium nitrate per liter in sufficient amount to convert the $Mg^{++}$ ions in the solution and the MgO values of the calcined dolomite to magnesium hydroxide precipitate and to convert the CaO value of the calcined dolomite to $Ca^{++}$ ions in the nitrate solution. Thus, for example, 1 liter of 2 N aq. $Mg(NO_3)_2$ reacts with 1 g. mol of calcined dolomite (96.40 g.) to yield 2 g. mols of $Mg(OH)_2$ and an approximately 2 N solution of $Ca(NO_3)_2$, a slight amount of water being in combination with the $Mg(OH)_2$. In this reaction the solid magnesium hydroxide particles produced precipitate and are separated from the solution containing calcium nitrate. The calcium nitrate solution is then contacted and reacted with a further amount of calcined dolomite together with gaseous carbon dioxide ($CO_2$) in sufficient amount to convert the $Ca^{++}$ ions in the solution and the CaO value in the calcined dolomite to calcium carbonate, which precipitates, and to convert the MgO values in the calcined dolomite to dissolved $Mg(NO_3)_2$ in the nitrate-containing solution. The amount of $CO_2$ required can be calculated from the equation $$CaO + MgO + Ca(NO_3)_2 + 2CO_2 \rightarrow 2CaCO_3 + Mg(NO_3)_2$$

and the efficiency of the carbonation reaction. An efficiency of 70–80% can be expected in, for example, a 3-stage countercurrent reactor. Preferably, the carbonation is carried out at or above 90° C. so as to form the denser, coarser, and therefore, more readily filterable aragonite form of $CaCO_3$. A reaction temperature of 90° C. or higher is not difficult to maintain if hot calcined dolomite is used, especially since the reaction is exothermic.

After separating the calcium carbonate so formed from the magnesium nitrate solution, this solution can, for most economical operation, be recycled to the first step of the process for reaction with more calcined dolomite.

It will be understood that calcined dolomite is formed by heating dolomite rock to such a temperature, for example about 1100° C., as to decompose the magnesium and calcium carbonate to magnesium oxide and calcium oxide in an active, as opposed to deadburned, state. While it is preferred that the calcined dolomite which is reacted with the magnesium nitrate solution be in the form of CaO and MgO, it will be understood that upon contact with the aqueous solution the CaO and MgO will tend to hydrate to $Ca(OH)_2$ and $Mg(OH)_2$, respectively, and that it is possible to carry out this hydration reaction before contacting the calcium and magnesium values with the magnesium nitrate solution.

It will also be understood that it is essential to the successful operation of this process that the dolomite be completely decompsed from the carbonate or, stated differently, that the calcined dolomite used in this reaction contain essentially no calcium or magnesium carbonate. The reason for this is found in the relative solubilities of the various calcium and magnesium compounds involved, both carbonates being relatively insoluble and calcium oxide and hydroxide being relatively more (about 200 times) soluble than magnesium oxide and hydroxide. Thus, it will be very difficult to procure a rection in aqueous solution with, for example, calcium carbonate.

On the other hand, when calcined dolomite, being a mixture of CaO and MgO, is contacted with the aqueous magnesium nitrate solution, there will be approximately 200 times as much calcium dissolved as magnesium and the reaction will tend to produce dissolved $Ca^{++}$ ions and precipitated magnesium values. While the CaO and MgO tend to react with the water of the aqueous magnesium nitrate solution to form the respective hydroxides, the solubility relationship between the two hydroxides is similar to that between the two oxides, so the net result of the reaction is still to produce dissolved $Ca^{++}$ in the $NO_3^-$ solution and precipitated magnesium values in the form of magnesium hydroxide.

The magnesium hydroxide produced by this method is readily filtered to separate it from the calcium nitrate solution.

In the second reaction step, wherein further calcined dolomite, together with gaseous carbon dioxide, is reacted with the calcium nitrate solution, the carbon dioxide reacts with the CaO, with any $Ca(OH)_2$ formed, and with dissolved $Ca^{++}$ ions to form precipitated calcium carbonate, while the magnesium values go into solution as $Mg^{++}$ ions in conjunction with the $NO_3^-$ ions. Thus, the magnesium nitrate reactant used in the first step is regenerated for further use.

It will be understood that when reaction with CaO, for example, is referred to, it is intended to include any reactive form of lime, but to exclude unreactive lime, for example that combined with silica, for example as dicalcium silicate.

As an example of the practice of this invention, two liters of an aqueous solution of 294 grams of $$Mg(NO_3)_2$$

equivalent to 40.0 g./l. of MgO, were placed in a 5 liter stainless steel beaker. The solution was agitated by a 2½″ diameter propeller at 730 r.p.m. with a 3-legged baffle inserted to prevent splashing and to give better mixing. Calcined dolomite, analyzing 58.8% CaO, 0.55% loss on ignition the balance being essentially MgO, in the amount of 174 grams was added over a 30 second period to the agitated magnesium nitrate solution. The calcined dolomite all passed a 4 mesh screen and 60% was retained on a 35 mesh screen. Prior to the addition of the calcined dolomite the temperature was 25° C.; rising to a maximum of 38.5° C. 2 minutes after the addition of calcine. After 30 minutes reaction time, 100 ml. of the stirred mixture were removed and settled in a 100 ml. graduated stoppered cylinder 6.8 inches high. After 22 minutes settling time the precipitate had fallen 2.05 inches and after 330 minutes, 4.2 inches. The remainder of the precipitate was filtered, dried, washed with distilled water, dried, washed with acetone, dried overnight at 120° C., and analyzed. The dried precipitate showed a loss on ignition of 25.0% and the ignited precipitate showed a CaO content of 0.1%, based on the amount of MgO. The filtrant, being essentially $$Ca(NO_3)_2$$

solution, is regenerated by adding 88.69 g. of the calcined dolomite to 1000 ml. of filtrant and bubbling through it $CO_2$. The precipitate, which is essentially $CaCO_3$, is filtered, the resulting filtrant being essentially a $Mg(NO_3)_2$ solution.

In a comparison test, 2 liters of an aqueous solution of 189 grams $MgCl_2$, equivalent to 40.0 g./l. MgO, were similarly reacted with 174 grams of calcined dolomite. In this case, a settling test carried out under the same conditions after 30 minutes reaction time showed a settling of only 0.85 inch after 24 minutes and only 3.3 inches after 1334 minutes. The better settling characteristics of the magnesium hydroxide precipitate produced by the nitrate reaction are apparent.

What is claimed is:
1. The method of producing magnesium hydroxide which comprises:
   (1) admixing calcined dolomite and an aqueous solution of magnesium nitrate,
   (2) reacting said admixture to form magnesium hydroxide precipitate and an aqueous solution of calcium nitrate,
   (3) separately recovering said magnesium hydroxide precipitate and said calcium nitrate solution,
   (4) admixing said calcium nitrate solution with calcined dolomite and introducing gaseous carbon dioxide into said last-mentioned mixture,
   (5) reacting said carbon dioxide and said last-mentioned admixture to form calcium carbonate precipitate and magnesium nitrate solution,
   (6) separately recovering said calcium carbonate precipitate and said magnesium nitrate solution.

2. Method as in claim 1 wherein said recovered magnesium nitrate solution is recycled to step (1) to react with said first-mentioned calcined dolomite.

3. Method according to claim 1 wherein the magnesium nitrate solution used in step (1) is at ambient temperature.

4. Method according to claim 1 wherein sufficient magnesium nitrate is admixed in step (1) to react with all of the $Ca^{++}$ ion available in said dolomite.

5. Method according to claim 1 wherein sufficient carbon dioxide is used in step (4) to react with all the available $Ca^{++}$ ion to form calcium carbonate.

References Cited
UNITED STATES PATENTS 2,137,675   11/1938   MacIntire _____ 23—201 X OSCAR R. VERTIZ, *Primary Examiner.*

G. T. OZAKI, *Assistant Examiner.*